United States Patent Office 2,982,916
Patented May 2, 1961

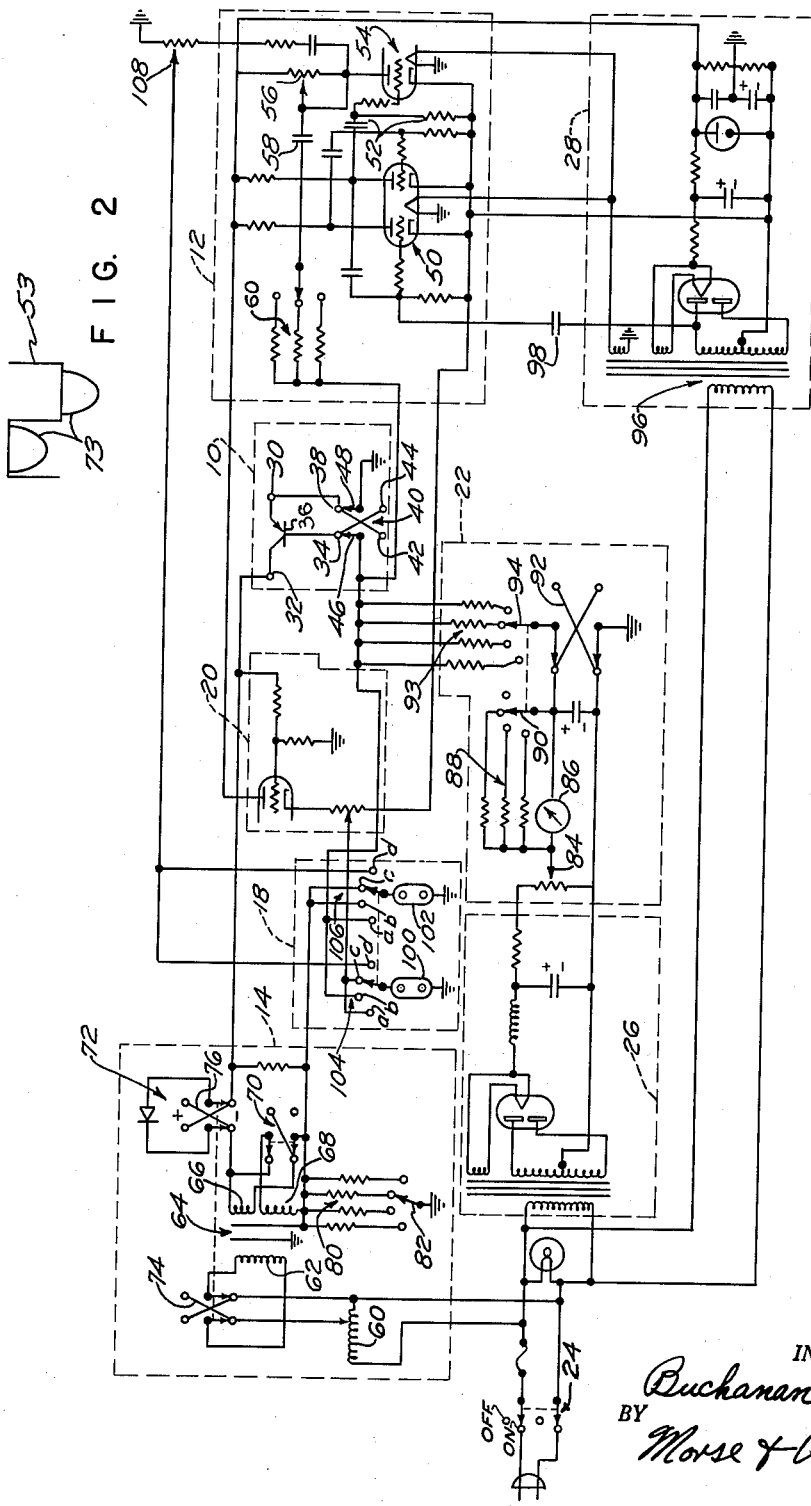

2,982,916
TRANSISTOR TEST DEVICES

Buchanan Loesch, Reading, Mass., assignor to Dunn Engineering Associates, Inc., Cambridge, Mass., a corporation of Massachusetts Filed Oct. 1, 1957, Ser. No. 687,436

4 Claims. (Cl. 324—158)

The present invention relates to a device for determining the characteristics of transistors and, more particularly, to a device for displaying curves of transistor characteristics on a cathode ray oscilloscope. Such a device, if designed to display only a single curve (capable, for example, of indicating hysteresis, anomalies, etc.) may embody a relatively simple construction that is compact and inexpensive. Such a device if designed to display a multiplicity of curves (capable, for example, of indicating all information obtainable from a single curve, together with the small signal parameters and their variations with temperature, humidity, overload, etc.) may require a relatively complex construction that is unwieldly and expensive.

The primary object of the present invention is to provide such a device that approaches a single curve design in simplicity of construction but a multiple curve design in completeness of information. This device presents a selected pair of characteristic curves that make available primarily desired information respecting the emitter, collector and base electrodes of a transistor in response to a sweep voltage applied to one of the electrodes and a square wave voltage applied to another. By virtue of the simple circuitry capable of generating such a pair of voltages, elementary switching may be employed for the purpose of selectively applying the sweep voltage and the square wave voltage to desired electrodes of a transistor of any type.

Other objects of the present invention will in part be obvious and will in part appear hereinafter.

The invention accordingly comprises the devices possessing the features, properties and relations of components that are exemplified in the following detailed disclosure and the scope of which will be indicated in the appended claims.

For a fuller understanding of the nature and objects of the present invention, reference should be had to the following detailed description, taken in connection with the accompanying drawing, wherein:

Figure 1 illustrates a schematic diagram of a preferred embodiment of the present invention; and Fig. 2 illustrates relationships between signals generated within the embodiment of Fig. 1.

Generally, the illustrated device is capable of producing a desired pair of static characteristic curves of a point contact, NPN junction, or PNP junction transistor, in the grounded emitter or grounded base state. Specifically, the characteristic curves displayed by the illustrated device are the $h_{12}$ curve of collector voltage versus emitter to grounded base or base to grounded emitter voltage, the $r_{12}$ curve of emitter to grounded base or base to grounded emitter voltage versus collector current and the $r_{22}$ curve of collector voltage versus collector current. The device is shown generally as comprising: a transistor socket 10 having terminals for connection to the emitter collector and base electrodes of a transistor; a variable amplitude square wave generator 12 that applies its output either to the emitter or to the base electrode terminal of socket 10; a sweep voltage generator 14 that applies two complete sweep voltages to the collector electrode terminal of socket 10 in synchronism with the two halves of the aforementioned square wave; and a cathode ray oscilloscope 18 including a switch for selectively applying, to the vertical and horizontal deflection plates of the oscilliscope, signals appropriately representing collector voltage, emitter voltage, base voltage and collector current. Specifically, the collector voltage is represented by a signal from a cathode follower 20, the grid of which is controlled by the potential at the collector electrode of transistor socket 10. The base voltage or emitter voltage to ground is represented by a signal from transistor socket 10 of a magnitude that is determined by the current through the base or emitter electrode from a transistor operating level control 22. The collector current is represented by a signal of a magnitude that is determined by the current through the collector electrode from sweep voltage generator 14. Sweep voltage generator 14 is energized directly from an input line 24. Operating level control 22 and square wave generator 12 are energized respectively by full wave rectifiers 26 and 28, which in turn are energized by input power line 24.

As shown, transistor socket 10 includes three terminals 30, 32 and 34 to which the emitter, collector and base electrodes of a transistor 36 (of the point contact, NPN junction or PNP junction type) may be connected. Terminal 34 and a terminal 38 that is shunted to terminal 30, constitute two poles of a double pole-double throw reverse switch 40. Also included in this reverse switch 40 are: a pair of terminals 43 and 44 connected respectively to terminals 38 and 34; and a pair of ganged blades 46 and 48, which ground one of terminals 34 and 30 (shunted to 38) and connect the other to square wave generator 12 in a manner now to be described.

Square wave generator 12 comprises a multi-vibrator 50 including in conventional fashion a pair of electron valves, the control electrode of each capacitively connected to the positive electrode of the other. Multivibrator 50 applies, via a resistor-capacitator coupling 52, a 30 cycle per second square wave, shown at 53 in Fig. 2, to an overdriven amplifier stage 54. The square wave output of amplifier 54 is applied through a variable resistor 56, a capacitor 58 and one of a bank of three resistors 60 to blade 46 of reverse switch 40.

Sweep voltage generator 14 is energized by power line 24 through an adjustable inductor 60 that applies an input alternating current to the primary 62 of an inductor 64 having two secondary windings 66 and 68. These secondary windings are interconnected by a double pole-double throw reverse switch 70, which serves to maximize either the current or the voltage generated. The sinusoidal output of inductor 64 is transformed by a rectifier 72 into sinusoidal half waves, shown at 73 in Fig. 2, that are applied to collector terminal 32 of transistor socket 10. Two of these half waves occur in synchronism respectively with the two halves of the square wave applied to emitter terminal 30 or base terminal 34 of transistor socket 10 by blade 46. A pair of ganged double pole-double throw reverse switches 74 and 76 serve to select halfwave sweep pulses of a polarity appropriate to the type of transistor being tested and to the particular electrode being grounded. The current response to these half wave sweep pulses is a function of the one resistor of bank 80 selected by the blade of a switch 82.

The magnitude of the base or emitter current is controlled by operating level 22, which includes a potentiometer 84 for tapping a selected voltage from the total voltage output of full wave rectifier 26, a meter 86 for indicating direct current microamperage, a bank of resistors 88 for changing the scale of meter 86 via a switch 90, a double pole-double throw reverse switch 92, which correlates the polarity of the voltage output of potentiometer 84 with the type of transistor being tested and the particular electrode being grounded, and a bank of resistors 93 for controlling via a switch 94 either base or emitter current flow.

Multivibrator 50 is triggered once every other cycle of alternating current input from power line 24 through a transformer 96 and a capacitor coupling 98 that applies a synchronizing signal to one grid of a double vacuum tube. The B+ and B− voltage applied across the plates and cathodes of multivibrator 50, as well as to cathode follower 20, constitutes the output of full wave rectifier 28.

Signals for cathode ray oscilloscope 18 are applied to the input terminal of a vertical amplifier 100 and the input terminal of a horizontal amplifier 102 through a pair of ganged rotary switches 104 and 106, respectively, each comprising a blade and four contacts $a$, $b$, $c$ and $d$. In operation, signals representing collector voltage vs. emitter to grounded base voltage or base to grounded emitter voltage produce a pair of $h_{12}$ curves when the blades of switches 104 and 106 are in positions $a$, $a$. Here the potential at collector terminal 32 of transistor socket 10 controls the grid of cathode follower 20 to apply a signal to contact 104$a$ and current flowing through blade 46 from either terminal 30 or terminal 34 generates a signal representing the voltage of that terminal at contact 106$a$. Signals representing the emitter to grounded base voltage or the base to grounded emitter voltage vs. the collector current produce a pair of $r_{12}$ curves when the blades of switches 104 and 106 are in positions $b$, $b$. Here the signal produced at contact 104$b$ is identical to that produced as above described at 106$a$ (terminals 104$b$ and 106$a$ are connected together) and the signal produced at 106$b$ represents the current flowing through collector terminal 32 by virtue of its IR drop across one of resistors 80. Signals representing collector voltage vs. collector current produce a pair of $r_{22}$ curves when the blades of switches 104 and 106 are in positions $c$, $c$. Here the signal applied to contact 104$c$ is the same as that applied to contact 104$a$ as described above (contacts 104$a$ and 104$c$ are connected) and the signal applied to contact 106$c$ is the same as that applied to contact 106$b$ as described above (contacts 106$b$ and 106$c$ are connected). A potentiometer 108 applies test voltages to contacts 104$d$ and 106$d$ for the purposes of calibration.

Since certain changes may be made in the above device without departing from the scope of the invention herein involved, it is intended that all matter contained in the above description and shown in the accompanying drawing shall be interpreted in an illustrative and not in a limiting sense.

What is claimed is:

1. A transistor test device comprising a test socket including terminals for connection to the emitter, collector and base electrodes of a transistor, means for applying a sweep voltage to a first of said electrodes, means for providing a square wave voltage to a second of said electrodes, means for returning a third of said electrodes to ground, said sweep voltage having twice the repetition frequency of said square wave voltages, and means responsive to signals generated by said first-mentioned means and said second-mentioned means in order to indicate the characteristics of said transistor.

2. A transistor test device comprising a test socket including terminals for connection to the emitter, collector and base electrodes of a transistor, an alternating current power inlet, a transformer having primary winding means connected across said power inlet and secondary winding means for producing a signal in response thereto, a rectifier for producing sweep signals in response to the signal transmitted from said secondary winding means, and for applying said sweep signals to the collector electrode of said test socket, a square wave generator for producing square waves each having a positive-going half and a negative going half, successive sweep signals occurring at the same time as successive halves of said square waves, a switch for selectively applying said square waves to one of the emitter and the base electrode terminals of said test socket, and for connecting the other of said emitter and said base electrode terminals to ground, and means for applying a resulting signal from one of said electrode terminals and a resulting signal from another of said electrode terminals to the horizontal and vertical sweep control terminals of a cathode ray tube.

3. A transistor test device comprising a test socket including terminals for connection to the emitter, collector and base electrodes of a transistor, an alternating current power inlet, a transformer having primary winding means connected across said power inlet and secondary winding means for producing a signal in response thereto, a rectifier for producing sweep signals in response to the signal transmitted from said secondary windings and for applying said sweep signals to the collector electrode of said test socket, a square wave generator for producing square waves each having a positive-going half and a negative-going half, successive sweep signals occurring at the same time as successive halves of said square waves, a switch for selectively applying said square waves to one of the emitter and the base electrode terminals of said test socket, and for connecting the other of said emitter and said base electrode terminals to the ground, a cathode ray tube including a horizontal sweep control and a vertical sweep control, and means for applying the resulting signal from one of said electrode terminals to said horizontal sweep control and the resulting signal from another of said electrode terminals to said vertical sweep control.

4. A transistor test device comprising a test socket including terminals for connection to the emitter, collector and base electrodes of a transistor, means for generating a sweep voltage, means for reversing the polarity of said sweep voltage, means for generating a square wave voltage, said sweep voltage having twice the repetition frequency of said square wave voltage, means for applying said sweep voltage, said square wave voltage and ground to selected terminals of said test socket, and means responsive to signals generated by said first mentioned means and said third mentioned means in order to indicate the characteristics of said transistor.

References Cited in the file of this patent

UNITED STATES PATENTS 2,833,986     Golden _____ May 6, 1958

OTHER REFERENCES

The Sylvania Technologist, vol. IV, No. 3, pp. 61–63, July 1951.

"Methods and Equipment for Transistor Testing," Electronics, pp. 172–175, July 1953.

Kurshaw et al.: Electronics, February 1953, pp. 122–127.